Jan. 23, 1945.  J. W. TOOKE  2,367,701
SEPARATION OF HYDROCARBONS
Filed June 15, 1942
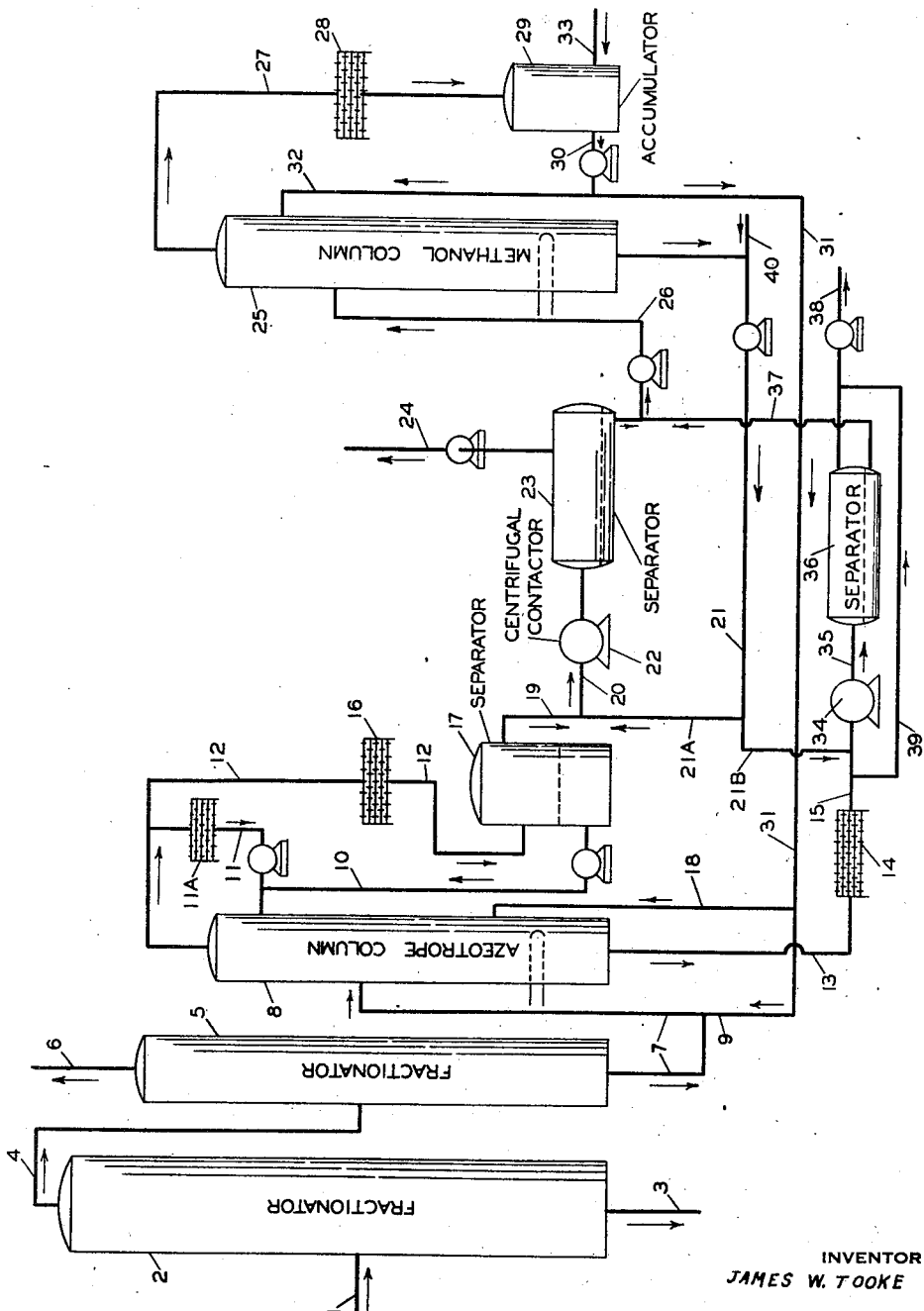
INVENTOR
JAMES W. TOOKE
BY
Hudson, Young and Yinger
ATTORNEY Patented Jan. 23, 1945

2,367,701

UNITED STATES PATENT OFFICE 2,367,701

SEPARATION OF HYDROCARBONS

James W. Tooke, Bartlesville, Okla., assignor to Phillips Petroleum Company, a corporation of Delaware Application June 15, 1942, Serial No. 447,105

13 Claims. (Cl. 202—42)

This invention relates to a method for separating hydrocarbons which boil closely together or form binaries such that separation cannot be accomplished by simple fractional distillation. More particularly, this invention relates to the separation of n-heptane from methyl cyclohexane.

This application is a continuation-in-part of my application Serial No. 428,792, filed January 29, 1942.

Both n-heptane and methyl cyclohexane in an essentially pure state have considerable value over and above that of the same compounds when present in the ordinary impure commercial fractions. A practical and commercially feasible method of removing n-heptane from hydrocarbon mixtures is of particular value, since by the process of aromatization the n-heptane may be converted into toluene. Furthermore, methyl cyclohexane may be dehydrogenated to toluene. Toluene is a strategic chemical necessary in the manufacture of certain high explosives, the most important of which is trinitrotoluene. Toluene also finds use as raw material for other organic compounds, and is an important solvent.

Napthenic compounds, and thus methyl cyclohexane, are of exceedingly great importance in the blending of aviation fuels. An aviation fuel of optimum properties for any given conditions of operation may advantageously contain up to one-third or more of naphthenes. It has been discovered that aviation fuels containing naphthenes are much superior to those fuels consisting of only paraffinic hydrocarbons. This is especially true when a "rich mixture" is required in the engine, as in the engines of pursuit and interceptor type planes during periods of rapid acceleration. Accordingly, it is now also of great consequence to find a practical process for preparing substantially pure single naphthenes. The realization of such a process would enable one to prepare more readily an aviation fuel of balanced properties for operation under any actual motor conditions. Removal of normal heptane from methyl cyclohexane to be used in aviation fuels is of particular importance due to the zero octane number of normal heptane.

Methyl cyclohexane is a valuable naphthene which occurs naturally in relatively small amounts in such complex hydrocarbon mixtures as natural and straight run gasoline. Normal heptane ordinarily is found in substantial quantities in such gasolines. The complexity of such mixtures requires very efficient fractionation to accomplish even a partial segregation, but final products of high purity cannot be obtained by this means alone due to the apparent formation of a constant-boiling mixture of methyl cyclohexane with n-heptane. I have now devised a process utilizing azeotropic distillation with methanol under certain conditions which enables me to isolate n-heptane and methyl cyclohexane one from the other, each substantially pure if desired, in an economical and practical manner as will be more fully disclosed hereinafter.

Not only is it important that methyl cyclohexane be obtained substantially free from n-heptane due to the low octane number of the latter, but it is also of importance to recover as much of the methyl cyclohexane as possible due to its relative scarcity. Thus, controlling conditions so that the normal heptane is relatively free from residual methyl cyclohexane, is an important aspect of my invention.

The difficulties involved in obtaining a really efficient separation will be realized by a consideration of the boiling points of the two hydrocarbons in question. At standard atmospheric pressure, n-heptane boils at 209.1 F. (98.4 C.) and methyl cyclohexane boils at 212.5 F. (100.3 C.). However, as stated above, the separation is much more difficult than would be anticipated even with these close boiling points, inasmuch as apparently a constant-boiling mixture is sometimes formed between the two hydrocarbons.

It is an object of this invention to provide a method for the separation of a complex hydrocarbon mixture into one or more substantially pure components. It is a further object of this invention to provide a batch or continuous process for recovering n-heptane from methyl cyclohexane.

Still another object is to provide a continuous process in which an essentially two-component mixture of n-heptane and methyl cyclohexane is fractionated out of a more complex mixture of hydrocarbons and then distilled azeotropically under certain specific conditions in the presence of methanol in order to obtain a complete separation with the consequent recovery of substantially pure n-heptane admixed with methanol, on the one hand, and substantially pure methyl cyclohexane on the other hand, which may, or may not, be admixed with methanol.

It is a further object of this invention to provide a continuous process for such separation, further characterized by the efficient separation and recovery of the methanol from the hydrocarbon products.

Various other objects and advantages of the invention will be apparent from the following detailed description.

Briefly, one form of my invention comprises (1) fractionating a complex hydrocarbon mixture to obtain an essentially two-component mixture of n-heptane and methyl cyclohexane, (2) fractionating this two-component mixture of n-heptane and methtyl cyclohexane with methanol under certain specific conditions hereinafter disclosed in detail so as to remove methyl cyclohexane plus methanol as bottom product and n-heptane plus methanol as top product, (3) cooling said top product to form two phases, (4) recycling the methanol-rich phase to the fractionator, preferably as reflux, (5) admixing the n-heptane-rich phase with water and allowing the water layer to separate and settle giving an upper n-heptane-rich phase substantially free from methyl cyclohexane, methanol, and water; and a lower methanol-water layer practically free from hydrocarbons, (6) separating the lower methanol-water layer into its components which are reused in the process, and (7) separating substantially pure methyl cyclohexane from the bottom product of the fractionation by water washing in a method similar to that described previously in steps (5) and (6).

The accompanying drawing is a schematic flow-sheet showing one arrangement of equipment for carrying out my invention in a continuous manner, starting with a gasoline stock containing n-heptane and methyl cyclohexane along with other hydrocarbons.

By treating complex hydrocarbon mixtures containing methyl cyclohexane and n-heptane under certain operating conditions, I have found that I am able to obtain essentially pure methyl cyclohexane and n-heptane. These operating conditions will now be disclosed in detail. Natural gasoline and straight-run gasoline are the most common sources of the desired materials; these gasolines are mixtures of straight- and branched-chain paraffins, naphthenes, and possibly aromatics. Other sources may be used; however, if hydrocarbon types other than paraffins and naphthenes, olefins for example, are in such sources, they should preferably first be removed by polymerization or similar processes in order to decrease the complexity of the mixture. The natural gasoline or other material is first fractionated in an efficient fractionating column or columns in order to separate out hydrocarbons other than normal heptane and the close-boiling naphthene, methyl cyclohexane. Reference to the drawing shows that hydrocarbons heavier than methyl cyclohexane, i. e., octanes and heavier, may be removed as a bottom product from a first fractionator; while lighter compounds, including n-heptane and methyl cyclohexane, are taken off overhead. Generally, isomeric octanes would not be permitted to pass from the top of the column since they would merely complicate the subsequent operations. The n-heptane, methyl cyclohexane, and lighter overhead product is now taken to another efficient column where all material lighter than n-heptane is taken overhead, leaving n-heptane and methyl cyclohexane as kettle product.

Another method of carrying out the preliminary fractionation is to first depentanize the natural gasoline. The kettle product from this fractionation is then dehexanized in a second column. The bottoms from this column go to a third column where hydrocarbons lower boiling than n-heptane are taken off as overhead product. The bottom product of this third column then consists of n-heptane and heavier material. By running these bottoms through an efficient fourth column, a normal heptane concentrate containing also methyl cyclohexane is produced as the overhead product. Higher-boiling compounds are, of course, removed at the bottom of this column. Illustrative Example No. I, set fourth in detail below, consists of data obtained by running a batch distillation in an exceedingly efficient fractionating column on bottom product obtained from the third column, i. e., on material heavier than isomeric heptanes.

The normal heptane concentrate is pumped into a fractionating column into which methanol is also introduced. This column is best operated at a pressure above about 10 pounds per square inch gage and preferably not above about 50 pounds per square inch gage, and at a temperature at the head of the column above about 160° F. and preferably not above about 220° F. If substantially pure products are desired, the reflux ratio used, based on the hydrocarbon product taken from the system by removal from the overhead product, is at least about 20 to 1. The reflux ratio is defined in this case as the liquid volume of the total reflux (methanol plus hydrocarbon) divided by the liquid volume of the hydrocarbon content of the overhead product which is completely removed from the fractionation system.

The liquid volume ratio of normal heptane to methanol entering the column must generally be maintained substantially lower than 2.3 to 1. With reference to this ratio, the methanol referred to is all the methanol entering from any source, whether as fresh feed, reflux, etc.; and the normal heptane referred to is all the normal heptane entering from any source, whether as fresh feed to be segregated, or mixed with methanol and returning as a methanol-rich stream or as reflux. When the ratio is thus maintained at substantially less than 2.3 to 1, the kettle product will contain some methanol if the overhead product corresponds to the azeotropic composition of normal heptane and methanol. If an overhead richer in methanol than the azeotrope is produced, the kettle product may or may not contain methanol.

When the conditions listed above are followed, very good separation may be obtained in continuous operation by using a column of about 50 theoretical plates. Batch operation requires a fewer number of plates; a column equivalent to about 35 theoretical plates will accomplish very efficient separation. I have obtained substantially complete separation by operating under these conditions. The results of such an azeotropic distillation are further illustrated below in Example II. These results are far superior to the results reported by previous workers treating other hydrocarbon mixtures, who could not even approach the separation of pure components without resorting to a large number of extremely fine fractionations and/or other treatments, operating in very efficient columns at atmospheric pressure.

If the ratio of n-heptane to methanol entering the column is strictly controlled so that it is equal to the ratio of n-heptane to methanol in the overhead product removed from the system, a bottom product may be obtained which free from methanol. Said ratio must be maintained at a value of between 2.3:1 and 3.0:1 (by volume) if the composition of the overhead product is equivalent to that of the azeotrope of n-heptane and methanol. The disadvantage of this method of operating is that a column with a greater number of plates will be required than that used for the distillation with an excess of methanol. Choice of the method of operation will be governed by the economics involved, balancing the cost of separating excess methanol from the methyl cyclohexane against the cost of the added plates, etc.

In cases where essentially pure n-heptane and/or methyl cyclohexane are not required, operating in a less efficient column or with a much lower reflux ratio, but otherwise under the conditions disclosed herein, may be done so as to give a more or less impure top and/or bottom product more efficiently and economically than can be accomplished without practicing the teachings of my invention. Commercial considerations will determine the purity required.

Referring now to the drawing, a natural gasoline or other complex hydrocarbon mixture containing n-heptane and methyl cyclohexane is led by line 1 into fractionator 2 where it is divided into a bottom product which leaves by line 3 and a top product of n-heptane, methyl cyclohexane, and lighter hydrocarbons, which passes by line 4 into column 5. In column 5, material boiling below n-heptane is taken off overhead through line 6. This leaves n-heptane and methyl cyclohexane as a kettle product, which is continuously led by line 7 into the azeotrope column 8.

It is possible for methanol, which acts as an entrainer, i. e., forms an azeotropic mixture with n-heptane, to pass into column 8 at several different points. Methanol may come from line 31 through line 9 for admixture with the charge stock in line 7 and/or through line 18 directly into the lower part of the column. Some methanol also enters near the top of the column from line 10 and/or 11 as reflux. That methanol entering the column as reflux usually has n-heptane in it as will be seen from the description below, while the methanol from line 31 is generally free from hydrocarbons. Condenser 11A is used to condense any amount of the overhead product which may be desired for use as reflux, which returns to column 8 through line 11 as described. However, all of the reflux may sometimes be supplied from line 10. The necessary temperatures, pressures, and other operating conditions in column 8 have already been disclosed in detail. A steam coil or other heating means is, of course, required for supplying heat to the bottom of column 8. N-heptane and methanol pass off overhead from column 8 through line 12. The composition of this overhead material will generally correspond to the azeotrope of n-heptane with methanol. In case the proportion of methanol to charge stock should be so regulated that all of the n-heptane would pass off overhead through line 12 along with all of the methanol, the methyl cyclohexane would leave the bottom of the column through line 13 free from any methanol.

After passing through cooler 16, which is interposed in line 12, the cooled n-heptane-methanol mixture enters separator 17 and separates into an upper hydrocarbon-rich layer and a lower methanol-rich layer, which lower layer is taken via line 18 for reintroduction into column 8. The upper layer of n-heptane with methanol dissolved therein passes via line 19 into line 20. Also entering line 20 is a stream of water from line 21A. The mixture of n-heptane, methanol, and water passes through a centrifugal contactor 22 interposed in line 20, for thorough mixing, and thence to separator 23, wherein the n-heptane practically free from methanol and water, is separated as an upper phase which is finally passed to storage or further use via line 24.

The methanol-water lower layer in separator 23 is sent to fractionator 25 via line 26. Methanol is readily separated from water in column 25 and passes overhead through line 27 and condenser 28 to accumulator 29, while the water leaves the kettle via line 21 which feeds lines 21A and 21B. Fresh water is supplied to the system by line 40 when required. By means of line 30, methanol is passed from the accumulator to line 31 through which it flows for re-use in azeotrope column 8. Line 30 is also connected with line 32 which leads to the top of column 25 and furnishes reflux for the column. Make-up methanol may be brought into the system through line 33. Column 25 is provided with a steam coil or other heating unit.

Returning to the methyl cyclohexane and methanol bottom product in line 13, this stream passes through cooler 14 into line 15. Water enters line 15 from line 21B and thorough mixing of the methyl cyclohexane and methanol with water is accomplished in centrifugal contactor 34. The mixture of methanol, hydrocarbon, and water passes from contactor 34 via line 35 to separator 36 and therein separates into two layers. The lower methanol-water layer is moved via line 37 to junction with line 26, and thus goes into methanol column 25 for separation into methanol and water. The upper layer in separator 36, essentially methyl cyclohexane free from water, methanol, and n-heptane, is conveyed by line 38 to storage.

In case the heretofore described proportioning of methanol and n-heptane entering column 8 is carried out so as to produce a bottom product in line 13 free from methanol, the water-contacting and methanol-removing system may be by-passed from a point in line 15 prior to entry of line 21B around to line 38 by means of line 39.

Various pumps are shown in the drawing where needed for maintaining flow of liquids. Valves for controlling pressures and flow rates are not shown in the drawing, their use in maintaining the requisite conditions of this invention being within the skill of the art.

A detailed description of the steps used in separating the methanol and recycling it through the system will now be given. At temperatures above about 124 F., I have found that n-heptane and methanol are miscible in all proportions. Accordingly, I cool the overhead product from the azeotrope column to a temperature somewhat below this value, for example to 85 or 90 F., and thus cause two layers to form in separator 17. That this formation of two layers effects considerable separation is evident from Table I.

TABLE I

*Solubility of n-heptane in methanol*

| Temperature, °F. | Volume per cent N-heptane | |
|---|---|---|
| | N-heptane layer | Methanol layer |
| 40 | 97.4 | 21.5 |
| 50 | 97.0 | 23.6 |
| 60 | 96.1 | 25.5 |
| 70 | 95.6 | 28.2 |
| 80 | 94.9 | 31.5 |
| 90 | 93.6 | 34.7 |
| 100 | 91.8 | 38.7 |
| 110 | 89.2 | 44.0 |
| 120 | 82.0 | 54.5 |

As previously described, the methanol layer is recycled to the column, preferably as reflux. A small percentage of water may sometimes be used to advantage in the methanol used in the azeotrope column.

The n-heptane layer still contains appreciable amounts of methanol which it is desirable to remove. I have found that only a very small quantity of water need be mixed with this n-heptane-rich layer in order to reduce the methanol content from about 10 or 15 per cent to less than 0.1 per cent. I generally add about one-third volume of water for each volume of methanol present, which means that the water content of the n-heptane-methanol-water mixture need be only from about three to five per cent or even less. A short, vigorous agitation followed by settling is all that is required to separate in separator 23 a layer of substantially pure n-heptane and a layer of methanol and water.

The methanol from the last-named layer may be readily recovered by distillation for re-use in the process. This is possible because methanol, unlike its homologs, i. e., ethanol, propanol, etc., does not form an azeotrope with water. A suitable fractionating column for making this separation is one having about 13 theoretical plates and operated at a reflux ratio of about one or two to one. Recycling of the methanol overhead from the methanol-water column provides sufficient methanol in the azeotrope column 8 to maintain the desired methanol-hydrocarbon ratio.

I have found that a mixture of methyl cyclohexane with methanol must be cooled to about 80 F. in order to accomplish the separation of two phases. Even this may be impossible if there is a large excess of one or the other component. Such a temperature cannot ordinarily be conveniently obtained with the cooling water usually available at a commercial installation. Therefore, unless refrigeration is available at little cost, I find it best to mix water with the methyl cyclohexane mixture in order to free the hydrocarbon from methanol. As in the case of the n-heptane-methanol mixture, the volume of water required is relatively small, the hydrocarbon is freed of substantially all methanol and water, and the methanol is easily recovered from the water by simple fractionation. However, as mentioned before, it may sometimes be more economical to produce a bottom product from the azeotropic distillation free from methanol in order to avoid the water washing, even at the expense of increasing the size of the azeotrope column. The choice, of course, will have to be decided in any individual case by taking the various factors into account, all in the light of the present disclosure.

It will be understood that the principles disclosed herein for a continuous process may be applied with suitable modifications to a batch process, and vice versa.

The following examples are given in order that the invention may be more readily and clearly understood. Example I relates to a simple fractionation of a complex hydrocarbon mixture containing methyl cyclohexane and n-heptane. Example II reveals data obtained by using methanol according to the terms of the present invention.

EXAMPLE I

A n-heptane-octanes fraction consisting of materials boiling higher than the isomeric heptanes and obtained from natural gasoline was carefully fractionated in a packed column 20 feet in height and having an efficiency of about 35 theoretical plates. A high reflux ratio was used and equilibrium conditions obtained at all times. Data for selected cuts from this run are listed in Table II, while data for various pure hydrocarbons present in this n-heptane-octanes cut are listed in Table III for comparison. The boiling range, designated as ASTM distillation, was obtained by the standard method of test for distillation of gasoline, naphtha, kerosene and similar petroleum products. Correction of boiling points was made to 760 mm. Hg pressure.

TABLE II

*Fractionation of n-heptane-octanes mixture in 35-plate column*

| Volume per cent distilled overhead | ASTM distillation boiling range, °F. | | API @ 60° F. | Principal component |
|---|---|---|---|---|
| | Initial boiling point | Dry point | | |
| 3.69 | 198 | 208 | 65.7 | Isomeric heptanes. |
| 5.57 | 202 | 208 | 64.5 | n-Heptane. |
| 7.43 | 202 | 208 | 64.9 | Do. |
| 9.43 | 202 | 206 | 65.5 | Do. |
| 11.08 | 203 | 207 | 65.8 | Do. |
| 12.92 | 203 | 208 | 65.7 | Do. |
| 14.77 | 203 | 208 | 65.6 | Do. |
| 16.60 | 203 | 208 | 66.0 | Do. |
| 18.56 | 205 | 209 | 65.5 | Do. |
| 20.4 | 205 | 209 | 65.9 | Do. |
| 22.3 | 205 | 210 | 65.3 | Do. |
| 24.2 | 207 | 210 | 64.2 | Do. |
| 26.1 | 208 | 210 | 61.0 | Methyl cyclohexane. |
| 27.9 | 208 | 211 | 60.8 | Do. |
| 29.8 | 208 | 211 | 60.6 | Do. |
| 31.7 | 208 | 211 | 59.8 | Do. |
| 33.5 | 208 | 211 | 59.5 | Do. |
| 35.4 | 208 | 212 | 58.0 | Do. |
| 37.3 | 209 | 212 | 57.5 | Do. |
| 39.2 | 210 | 214 | 56.0 | Do. |
| 42.9 | 208 | 212 | 55.7 | Do. |
| 44.8 | 209 | 214 | 54.6 | Do. |
| 46.6 | 210 | 216 | 53.8 | Do. |
| 50.1 | 215 | 226 | 55.0 | Do. |
| 55.9 | 228 | 238 | 60.2 | Isomeric octanes. |
| 57.0 | 234 | 243 | 61.3 | Do. |
| 62.5 | 238 | 245 | 63.0 | Do. |
| 70.7 | 245 | 252 | 60.2 | n-Octane. |
| 75.5 | 250 | 257 | 60.2 | Do. |
| 77.4 | 256 | 266 | 55.3 | Do. |
| 83.0 | 264 | 279 | 50.3 | Ethyl cyclohexane. |
| 87.7 | 271 | 299 | 56.4 | Isomeric nonanes. |

TABLE III

*Physical properties of pure hydrocarbons*

| Hydrocarbon | Boiling point, °F. | API @ 60° F. | ASTM octane number 0 cc. TEL |
|---|---|---|---|
| n-Hexane | 155.8 | 81.6 | |
| 2-methyl hexane | 194.2 | 75.2 | |
| 3-methyl hexane | 197.2 | 72.2 | |
| 3-ethyl pentane | 199.9 | 70.6 | |
| n-Heptane | 209.1 | 74.4 | 0.0 |
| Methyl cyclopentane | 161.2 | 56.4 | |
| Cyclohexane | 177.3 | 49.4 | |
| Methyl cyclohexane | 212.5 | 51.7 | 71.1 |
| Benzene | 176.2 | 30.4 | |
| Toluene | 231.2 | 32.5 | |

Examination of Tables II and III shows that isomeric heptanes were the first materials distilled over and amounted to about four per cent of the overhead. From approximately six per cent overhead to 24 per cent overhead, the product consisted mainly of n-heptane. Material coming over at 16.6 per cent overhead was richest in n-heptane, 63 per cent, while that coming over at 24 per cent overhead was poorest of the predominately n-heptane product, being only 55 per cent n-heptane. Beginning at 26.1 per cent overhead and continuing through 50 per cent overhead, methyl cyclohexane was the principal constituent. Composition of the product in this range varied from 90.7 per cent methyl cyclohexane at 46.6 per cent overhead to 59 per cent methyl cyclohexane at 26.1 per cent overhead. At about 56 per cent overhead almost all of the methyl cyclohexane and n-heptane had been removed and the isomeric octanes began to come over. They in turn were followed by n-octane at 70 to 77 per cent overhead, ethyl cyclohexane at about 83 per cent overhead, and isomeric nonanes as the final substance distilled over at about 88 per cent total overhead. Hydrocarbons remaining in the kettle bottoms were those boiling higher than about 300 F. Purities were calculated from the API gravities, being first converted to specific gravities for convenience. A straight-line relationship was assumed for the gravities of mixtures of the hydrocarbons.

The results of this distillation illustrate conclusively the practical impossibility of obtaining pure n-heptane from methyl cyclohexane by straight fractional distillation. The best fraction contained only 63 per cent n-heptane and the contaminating substance was irrecoverable methyl cyclohexane. Likewise, pure methyl cyclohexane was not obtained because of contamination with n-heptane. In neither case did the product consist of better than 91 per cent purity, and in the case of n-heptane, it was only 63 per cent pure n-heptane.

EXAMPLE II

A substantially constant-boiling normal heptane concentrate, separated from natural gasoline by close fractionation and having a boiling range, Fenske, of 2 F. (207–209), was fractionated batchwise in the presence of methanol to separate out substantially pure n-heptane and methyl cyclohexane. Boiling ranges referred to as Fenske were obtained at 760 mm. Hg pressure in an apparatus as described by Quiggle, Fenske et al., Ind. Eng. Chem., anal. ed., 6, 466 (1934).

A packed column 20 feet in height and having an efficiency equivalent to about 35 theoretical plates was used. Kettle capacity was 100 gallons. Pressures maintained in the still were from 37 to 50 pounds per square inch gage. Top temperatures were from 196 to 214 F. Reflux ratio was held at greater than 20 to 1.

At the beginning of the fractionation, the kettle was charged with 51.3 gallons of the n-heptane concentrate and 15 gallons of methanol. Heat was applied, the pressure was allowed to build up, and the column was operated under total reflux until equilibrium was established. Product was thereafter drawn off at the rate of 0.5 to 1.0 pound of hydrocarbon per hour. Data for selected cuts from this run are listed in Table IV. The percentages and properties referred to in the table are for dried hydrocarbon fractions after removal of methanol by water washing.

TABLE IV

*Distillation with methanol of n-heptane concentrate in 35-plate column*

| Volume per cent distilled overhead | Fenske boiling range, °F. | | API @ 60°F. | ASTM octane numbers | | |
|---|---|---|---|---|---|---|
| | Initial boiling point | Dry point | | 0 cc. TEL | 1 cc. TEL | 3 cc. TEL |
| 3.9 | 192.0 | 200.9 | 67.9 | 58.7 | | |
| 8.1 | 198.2 | 204.2 | 69.2 | | | |
| 12.3 | 200.3 | 204.5 | 69.5 | 46.3 | | |
| 16.6 | 203.9 | 206.7 | 70.2 | | | |
| 20.9 | 205.8 | 207.8 | 71.3 | 26.4 | | |
| 24.9 | 207.0 | 208.3 | 71.9 | | | |
| 27.1 | 207.5 | 208.5 | 72.3 | 16.5 | | |
| 31.3 | 207.9 | 209.1 | 72.9 | | | |
| 33.4 | 208.1 | 208.7 | 73.2 | 8.0 | | |
| 35.6 | 208.4 | 209.0 | 73.1 | | | |
| 37.6 | 208.6 | 209.0 | 72.9 | | | |
| 39.7 | 208.7 | 208.9 | 73.3 | 8.0 | | |
| 41.8 | 208.8 | 209.0 | 73.2 | | | |
| 44.0 | 208.2 | 209.0 | 72.9 | | | |
| 46.1 | 209.0 | 209.2 | 73.2 | | | |
| 48.3 | 209.0 | 209.4 | 73.3 | 8.0 | | |
| 50.5 | 208.8 | 208.9 | 73.2 | | | |
| 52.4 | 208.9 | 209.0 | 73.0 | | | |
| 54.6 | 208.6 | 209.1 | 72.9 | 8.3 | | |
| 56.7 | 208.7 | 209.0 | 72.6 | | | |
| 58.6 | 209.0 | 209.3 | 72.2 | | | |
| 60.8 | 209.2 | 209.5 | 72.3 | | | |
| 63.0 | 209.0 | 209.4 | 72.1 | 15.0 | | |
| 65.3 | 208.9 | 209.7 | 71.4 | | | |
| 67.1 | 209.1 | 209.6 | 71.6 | | | |
| 69.3 | 209.2 | 209.5 | 71.1 | | | |
| 71.2 | 209.3 | 209.9 | 69.4 | 24.9 | | |
| 75.1 | 209.4 | 209.9 | 69.1 | | | |
| 79.4 | 209.4 | 210.0 | 67.2 | | | |
| 83.1 | 211.3 | 211.9 | 59.4 | 54.4 | | |

ASTM DISTILLATION, °F.

| Kettle bottoms | 209 (5%-211, 50%-211, 60%-212, 90%-212, 95%-213). | 214 | 50.0 | 70.6 | 78.7 | 84.0 |

Examination of Tables III and IV shows that the product from about 25 to 63 per cent, overhead or 38 per cent of the total overhead, was better than 90 per cent n-heptane, and that the product at 48 per cent overhead was more than 95 per cent n-heptane. These results are decidedly in contrast to the best n-heptane, 63 per cent, which could be produced by straight fractionation in a column of similar efficiency, as described in Example I. All product, up to about 80 per cent overhead, was of greater purity than the richest cut obtained by straight fractionation. Only after practically all of the n-heptane had been removed from the kettle did the composition of the overhead drop below 67 per cent n-heptane.

The kettle product obtained, after washing with water, was a narrow-boiling naphthenic hydrocarbon fraction boiling in the range of about 212 F. at normal pressure, having a gravity at 60 F. of about 50 API, and having an ASTM octane number of about 71 with no added tetraethyl lead, of about 80 with 1 cc. tetraethyl lead per gallon, and of about 85 with 3 cc. tetraethyl lead per gallon. This product was found to be free of n-heptane and to consist of substantially pure methyl cyclohexane. It did contain small quantities of other cyclics, possibly dimethyl cyclohexanes, and perhaps a trace of toluene, which were present due to incomplete separation obtained when the n-heptane concentrate was first prepared by fractionation from natural gasoline. The kettle product was 16.9 per cent of the charge. The ASTM octane number relationships of this kettle product were closely similar to those of pure methyl cyclohexane. These relationships are shown in Table V.

TABLE V

*ASTM octane numbers*

| Cc. tetra-ethyl lead per gallon | Kettle bottoms | Methyl cyclo-hexane |
|---|---|---|
| 0.0 | 70.6 | 71.1 |
| 1.0 | 78.7 | 82.0 |
| 3.0 | 84.0 | 86.2 |

It should be emphasized that a column of 35 theoretical plates efficiency as used in these distillations could hardly be expected to produce sharp separations between close-boiling hydrocarbons and/or azeotropes, yet n-heptane was separated by the aid of methanol under the given conditions of temperature, pressure, and reflux ratio, in a purity of better than 95 per cent. It will be appreciated by those skilled in the art that an increase in purity of from 60 to 95 per cent is a separation of great significance, and as such represents an important accomplishment. Similarly, the production of substantially pure methyl cyclohexane by the aid of methanol is to be compared with the best methyl cyclohexane purity of only 91 per cent obtained by straight fractionation.

The separation of substantially pure n-heptane and substantially pure methyl cyclohexane from a mixture containing the same has been accomplished in a simple and economical manner. This separation may be maintained throughout a run by operating under a continuous method as described with reference to the drawing.

I claim:

1. A process for the separation of n-heptane and of methyl cyclohexane from a mixture containing the same which comprises fractionating said mixture in the presence of sufficient methanol to act as an azeotrope-forming agent, at a distillation pressure of at least about 10 pounds per square inch gage, and recovering a low-boiling fraction enriched in n-heptane and a higher-boiling fraction enriched in methyl cyclohexane.

2. A process for the separation of n-heptane and of methyl cyclohexane from a mixture containing the same by azeotropic distillation with methanol which comprises fractionating said mixture in the presence of substantial amounts of methanol at a distillation pressure above about 10 pounds per square inch gage and at a temperature above about 160 F. distillation, and recovering a low-boiling fraction enriched in n-heptane and a higher-boiling fraction enriched in methyl cyclohexane.

3. A process for the separation of n-heptane and of methyl cyclohexane from a mixture containing the same by azeotropic distillation with methanol which comprises fractionating said mixture in the presence of substantial amounts of methanol at a pressure in the range of about 10 to about 50 pounds per square inch gage and at a temperature in the range of about 160 to about 220 F., and recovering a low-boiling fraction enriched in n-heptane and a higher-boiling fraction enriched in methyl cyclohexane.

4. A process for producing concentrates of n-heptane and of methyl cyclohexane from a mixture of the same which comprises fractionally distilling said mixture with methanol at a distillation pressure above about 10 pounds per square inch gage and at a temperature above about 160 F., recovering top and bottom products containing hydrocarbon and methanol, and removing methanol from said top and bottom products to obtain hydrocarbons enriched in n-heptane and in methyl cyclohexane respectively.

5. A process for the separation of n-heptane and of methyl cyclohexane in substantially pure form from a mixture of the same which comprises fractionating said mixture in the presence of sufficient methanol to give a liquid volume ratio of n-heptane to methanol substantially less than about 2.3 to 1, in a fractionation system of at least about 35 theoretical plates, at distillation pressures above about 10 pounds per square inch gage and at temperatures above about 160 F., using a reflux ratio of at least about 20 to 1, recovering a low-boiling n-heptane fraction and a higher-boiling methyl cyclohexane fraction, and removing methanol from recovered hydrocarbon.

6. A continuous process for the separation of methyl cyclohexane from n-heptane by fractionation of a mixture comprising methyl cyclohexane and n-heptane in the presence of methanol, which comprises carrying out said fractionation at about 10 to about 50 pounds per square inch gage pressure and at about 160 to about 220 F., continuously removing an overhead methanol and n-heptane fraction from the fractionation system, continuously removing a methyl cyclohexane bottom product substantially free from n-heptane and methanol, and continuously supplying methanol in such proportions that the ratio of methanol entering the system to n-heptane entering the system is substantially equal to the ratio of methanol to n-heptane in said overhead fraction.

7. A process for recovering n-heptane from a substantially constant-boiling mixture with methyl cyclohexane, which comprises distilling said mixture with sufficient added methanol to effect substantial separation of said n-heptane from methyl cyclohexane in a fractionation column at pressures between about 10 and about 50 pounds per square inch gage and at top temperatures of about 160 to about 220 F., withdrawing an azeotropic mixture of n-heptane and methanol from the top of said column, separating methanol from said azeotropic mixture, and thereby obtaining n-heptane.

8. A process for continuously effecting separation between n-heptane and methyl cyclohexane which comprises continuously introducing a hydrocarbon mixture containing substantially only n-heptane and methyl cyclohexane into a fractionator, continuously introducing methanol into said fractionator in the ratio of one liquid volume of methanol to from about 2.3 to about 3.0 liquid volumes of n-heptane, distilling the contents of said fractionator at from about 10 to about 50 pounds per square inch gage and with a top temperature of from about 160 to about 220 F., and continuously removing an overhead product comprising predominately an azeotrope of n-heptane and methanol and a bottom product comprising predominately methyl cyclohexane.

9. In a continuous process for the separation of a mixture of methyl cyclohexane and n-heptane into its components by azeotropic distillation with methanol, the steps which comprise introducing said mixture into a fractionation zone, fractionating the same therein with methanol introduced as hereinafter described at distillation pressures above about 10 pounds per square inch gage and at temperatures above about 160 F., removing a bottom product comprising methyl cyclohexane, cooling overhead product comprising n-heptane and methanol from said zone to a temperature below about 124 F. to separate a n-heptane-rich phase and a methanol-rich phase, returning said methanol-rich phase to the fractionation zone to furnish at least a portion of the reflux, and introducing into said fractionation zone an additional amount of methanol substantially equal in quantity to that dissolved in said n-heptane-rich phase plus any dissolved in said bottom product.

10. A process for continuously producing n-heptane and methyl cyclohexane which comprises introducing a mixture thereof into a fractionator, introducing methanol into said fractionator, operating said fractionator at a distillation pressure above about 10 pounds per square inch gage, withdrawing n-heptane and methanol from the top of said fractionator at a temperature above about 160 F., cooling at least a portion of said n-heptane and methanol to below about 124 F. and passing to a separating zone to form two liquid layers, returning to the fractionator the lower layer from said separating zone, returning to the top of said fractionator at least about 20 liquid volumes of total reflux per volume of n-heptane separated from the fractionating system, withdrawing methyl cyclohexane and methanol from the fractionator as bottom product, separating n-heptane from the fractionating system by passing material from the upper layer from said separator first to intimate admixture with water and then to a first settling zone, said water being at least about one-third the volume of the methanol contained in said material from the upper layer, withdrawing from said first settling zone a substantially methanol-free n-heptane phase, passing said bottom product first to intimate admixture with water and then to a second settling zone, said water being at least about one-third the volume of the methanol in said bottom product, withdrawing from said second settling zone a substantially methanol-free methyl cyclohexane phase, passing the methanol-water phases from said first and second settling zones to a distillation unit, distilling methanol as top product and water as bottom product from said unit, recycling said methanol to the fractionator, and recycling a portion of said water to contact with said material from the upper layer from the aforementioned separator and a portion of said water to contact with said bottom product.

11. A process for the separation of methyl cyclohexane and of n-heptane in substantially pure form from a complex hydrocarbon mixture containing the same which comprises separating by fractional distillation a substantially constant-boiling mixture comprising essentially n-heptane and methyl cyclohexane, admixing methanol with said constant-boiling mixture, and fractionating the resulting mixture at a pressure from about 10 to about 50 pounds per square inch gage and at a temperature from about 160 to about 220 F. to separate overhead from methyl cyclohexane substantially all the n-heptane as an azeotrope with methanol.

12. A process for the production of a high-octane number aviation fuel blending stock comprising essentially methyl cyclohexane which comprises fractionating a natural gasoline containing methyl cyclohexane and n-heptane to remove octanes and heavier, deisoheptanizing the resulting product to produce a n-heptane-methyl cyclohexane fraction of narrow boiling range, fractionating said fraction in the presence of methanol at a pressure in the range of about 10 to about 50 pounds per square inch gage to take off substantially all the n-heptane as an azeotrope with methanol at an overhead temperature in the range of about 160 to about 220 F., and recovering as bottoms a high-octane number stock comprising essentially methyl cyclohexane.

13. A process for producing a narrow-boiling naphthenic hydrocarbon fraction boiling in the range of about 212 F. at standard atmospheric pressure, having a gravity at 60 F. of about 50 API, and having an ASTM octane number of about 71 with no added tetraethyl lead, of about 80 with 1 cc. tetraethyl lead per gallon, and of about 85 with 3 cc. tetraethyl lead per gallon, which process comprises depentanizing a natural gasoline containing methyl cyclohexane, dehexanizing the depentanized gasoline, deisoheptanizing the dehexanized gasoline, fractionating the deisoheptanized gasoline to produce a narrow-boiling naphthene-containing n-heptane fraction overhead and an octanes and heavier kettle product, fractionating the n-heptane fraction with methanol in a column equivalent to at least about 35 theoretical plates, with a reflux ratio of at least about 20 to 1, at a distillation pressure of at least about 10 pounds per square inch gage, and at a top temperature of at least about 160 F., along with at least sufficient methanol to permit substantially complete separation of n-heptane overhead as an azeotrope with methanol, and recovering the desired narrow-boiling naphthenic fraction from the kettle.

JAMES W. TOOKE.